Aug. 20, 1963  F. G. ADAMS  3,101,432
CONTROL APPARATUS
Filed Aug. 3, 1959
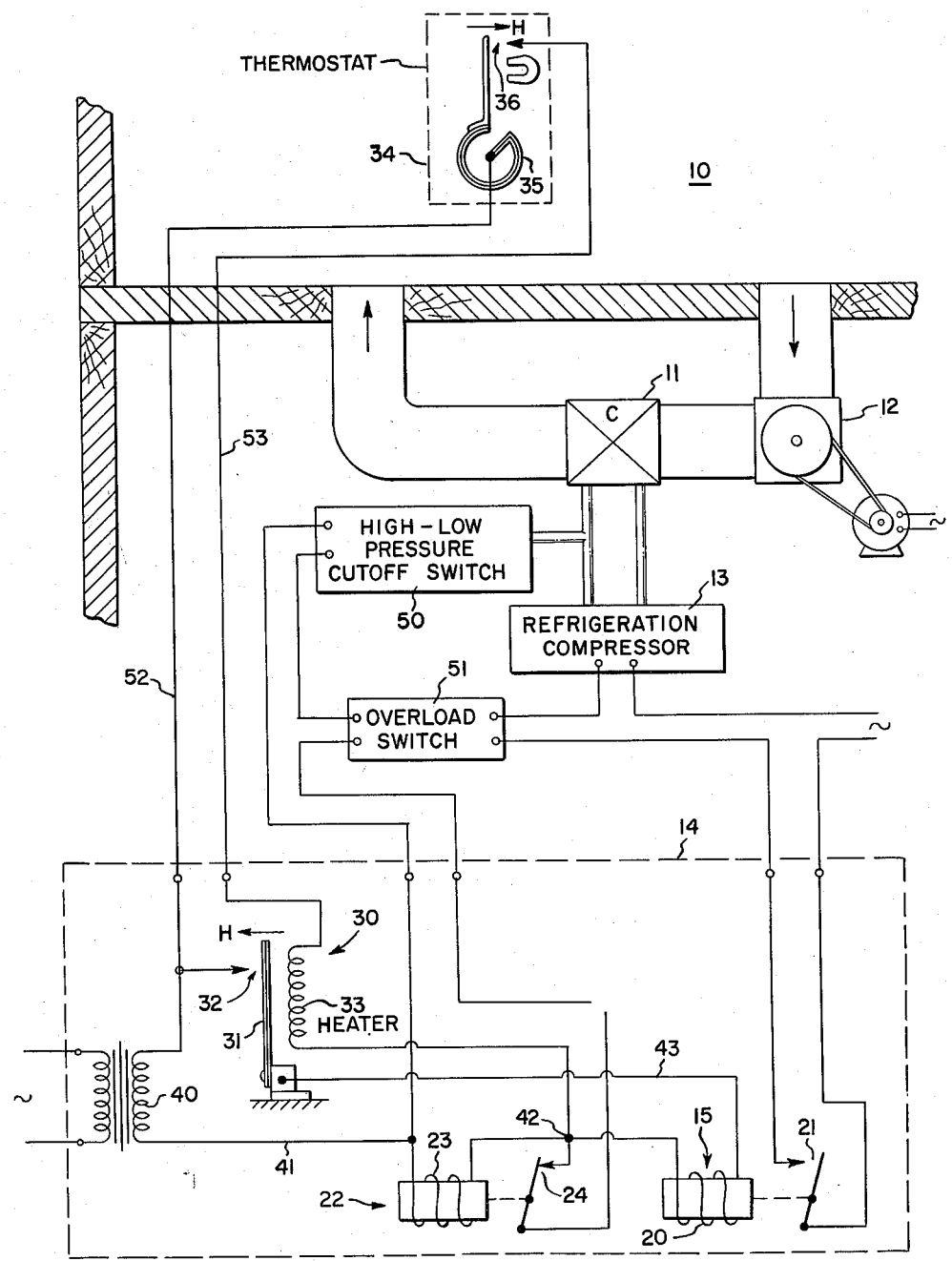
INVENTOR.
FREDERICK G. ADAMS
BY
*Clyde C. Blinn*
ATTORNEY

United States Patent Office 3,101,432
Patented Aug. 20, 1963

3,101,432
CONTROL APPARATUS
Frederick G. Adams, Wayzata, Minn., assignor to Minneapolis-Honeywell Regulator Company, Minneapolis, Minn., a corporation of Delaware
Filed Aug. 3, 1959, Ser. No. 831,386
4 Claims. (Cl. 317—13)

The present invention is concerned with an improved remote reset circuit for a control system for condition changing apparatus.

With the advent of residential air conditioning, numerous systems have been devised for remotely resetting a control system having an abnormal condition responsive circuit which shuts down the air conditioning apparatus upon the presence of an abnormal condition. One particular control system is commonly known as the "high impedance" reset circuit. A contactor energization winding has a high impedance energization winding of a second relay connected in series therewith. When an abnormal condition is present, a shunt circuit shorting out the high impedance winding is broken to place the high impedance in series with the contactor energization winding to reduce the current and cause the main control contactor to drop out. To remotely reset such a circuit, the space thermostat switch is momentarily opened to restore energization of the contactor.

Another problem which has come about in residential air conditioning is the damage to compressor motors and compressors which can be brought about by a frequent operation of the controlling thermostat. Not only does the compressor start under a very high load when it is re-energized too soon, but the life of the starting capacitors of the motors are shortened by this frequent starting. To overcome the damage that might take place, a time delay relay is often interposed between the thermostat and the main control circuit or the contactor. When the thermostat closes, the main contactor is energized after a predetermined period. When the thermostat is opened, a predetermined period of time must lapse before the main contactor will be de-energized.

When the time delay relay is interposed in a normal manner between the thermostat and the contactor control circuit of a "high impedance" control system, the reset operation has certain disadvantages as far as the homeowner is concerned. When the high impedance circuit de-energizes the main contactor, the thermostat must be held open for an extended time period determined by the time delay relay before the resetting action is obtained.

The present invention overcomes certain objections by connecting the time delay relay to provide for the resetting operation immediately upon the homeowner opening the space thermostat. With the present invention, the time delay relay can be used with the high impedance reset circuit, and immediate remote reset is obtained when the thermostat is opened.

An object of the present invention is to provide an improved reset circuit for a control system for a condition changing apparatus.

Another object of the present invention is to provide an improved reset circuit for air conditioning apparatus.

These and other objects of the present invention will become apparent upon the study of the following specification and drawing.

A single drawing discloses the invention as applied to a conventional air conditioning apparatus.

Referring to the single figure, the temperature of the air in space 10 is conditioned by circulating the air through a conventional cooling coil 11. The air flows through a return duct into a motor driven fan 12 to be cooled as it passes through coil 11 before returning to the space. A conventional refrigeration compressor 13 is connected to supply cooling medium to coil 11.

A panel 14 contains a contactor 15 having an energization winding 20 and a normally open switch 21. Switch 21 is connected to close the energization circuit of the refrigeration compressor whenever contactor 15 is energized. A relay 22 which is commonly known as a "high impedance" relay has an energization winding 23 and a normally closed switch 24.

A time delay relay 30 has a temperature responsive bimetal 31 which forms a part of a normally open switch 32. Bimetal 31 is heated by an electric heater 33. Upon the energization of heater 33, a predetermined time period lapses before switch 32 is closed. The time delay relay is shown in one particular embodiment; however, other types of time delay relays might be used. A thermostat 34 has a bimetal 35 for operating a normally open switch 36. When the temperature of the space 10 increases, switch 36 snaps closed.

Relay 22 and contactor 15 are connected in a circuit as follows: from the lower terminal of a secondary winding 40 of a source of power, a conductor 41, energization winding 23, connection terminal 42, energization winding 15, a conductor 43, switch 32, and back to the other side of secondary winding 40. Connected in parallel with energization winding 23 is a shunt circuit made up of abnormal condition responsive switches 50 and 51 and switch 24 connected in series. Switch 50 provides an open circuit when the pressure of the refrigeration apparatus becomes too high or too low. Switch 50 is commonly known as a high-low pressure cutoff switch. Switch 51 is commonly known as an overload switch, and the switch provides an open circuit when the current supplied to the refrigeration compressor through switch 21 exceeds some predetermined value.

Switch 36 of the thermostat is connected to control the contactor 15 through a circuit traced as follows: from the upper terminal of the secondary winding 40, a conductor 52, switch 36, a conductor 53, heater 33, terminal 42, switch 24, switch 51, switch 50, and back to the other side of the secondary winding 40 through conductor 41.

During the normal operation of the air conditioning system, switch 36 of the thermostat is closed when the temperature of space 10 reached some high predetermined value. The heater 33 of the time delay relay is energized to cause bimetal 31 to move to the left to close switch 32. When switch 32 is closed, contactor 15 is energized through the shunt circuit comprising the normally closed switch 24 and the abnormal condition responsive switches 50 and 51. Should the thermostat switch 36 be opened and closed momentarily, the time delay relay 30 maintains contactor 15 energized to keep the refrigeration compressor in operation. A fast opening and closing of switch 36 has no affect upon the operation of the refrigeration apparatus.

Let us assume that an abnormal condition takes place. If switch 51 opens the shunt circuit, energization winding 23 of the "high impedance" relay is placed in series with energization winding 20 of main contactor 15. Winding 23 is so designed to reduce the current of the series circuit including the energization windings 23 and 15 and switch 32 to cause contactor 15 to drop out and open switch 21. The refrigeration apparatus is de-energized and the system must be reset from the remote thermostat 34 before normal operation can continue. Immediately heater 33 begins to cool as the energization circuit through the normally closed switch 24 is broken. Switch 32 opens after a predetermined time; however, relay 22 remains energized through a circuit traced as follows: from the lower terminal of transformer 40, conductor 41, winding 23, heater 33, switch 36, and back to winding 40. When the thermostat switch 36 is momentarily opened by the homeowner to reset the control system, the relay 22 is de-energized, and the system is placed back in normal operation if the abnormal condition is no longer present. The resetting operation can be accomplished by momentarily opening thermostat switch 36 at any time after the abnormal condition resulting in the compressor shutdown no longer exists.

Upon the presence of an abnormal condition, the refrigeration apparatus is immediately de-energized, and even though the time delay relay is interposed between the thermostat and the contactor 15, the relay 22 can be deenergized by momentarily opening the thermostat switch 36 within a very short period since switch 32 opens a short time after the abnormal condition occurs. The disadvantage requiring that the homeowner open the thermostat and wait for a long period of time to allow the time delay relay to cool down to obtain the reset is not present in the system disclosed. While this disadvantage may appear to be insignificant, people involved with customers of air conditioning control systems find that homeowners become quite dissatisfied when an extended period of time holding a reset button in is necessary to place an air conditioning system in operation after the system has become inactive upon the presence of an abnormal condition. The present invention results in an improved system for obtaining immediate resetting operation.

While the present invention has been described as applied to an air conditioning system, the invention is applicable to other types of conditioning changing apparatus; therefore, the invention is intended only to be limited by the scope of the appended claims in which I claim:

1. In a control circuit for controlling the energization of air conditioning apparatus, first relay means having an energization winding and a normally closed switch controlled by said winding, second relay means having an energization winding and being adapted to control the air conditioning apparatus, time delay means having a first circuit which closes after a predetermined period of energization of a winding of said time delay means, a source of power, electrical circuit means connecting said first and second mentioned energization windings and said first circuit in series to said source of power, condition responsive switch means, said condition responsive switch means opening upon the presence of an abnormal condition, electrical means connecting said normally closed switch and said condition responsive switch means in series to shunt said energization winding of said first relay means so that upon the presence of an abnormal condition said shunt circuit is broken to place said energization winding of said first relay means in series with said energization winding of said second relay means, said energization winding of said first relay means having a high impedance thereby reducing the current to a predetermined low value to cause said second relay means to de-energize said conditioning apparatus, space temperature responsive switch means, and electrical circuit means connecting said temperature responsive switch means, said winding of said time delay means, and said energization winding of said first relay means in a series circuit to said source of power to maintain energization of said first relay means, said last mentioned circuit not providing sufficient energization of said time delay means so that said time delay means subsequently has an open first circuit, said temperature responsive switch means providing a means to open said last mentioned series circuit to de-energize said first relay means to re-establish normal operation of the control circuit.

2. In a control circuit for controlling the energization of air conditioning apparatus, first relay means having an energization winding and a normally closed switch controlled by said winding, second relay means having an energization winding and being adapted to control the air conditioning apparatus, time delay means having a first switch which closes after a predetermined period of energization of a winding of said time delay means, a source of power, electrical circuit means connecting said first and second mentioned energization windings and said first switch in series to said source of power, abnormal condition responsive switch operator opening a third switch upon the presence of an abnormal condition, electrical means connecting said normally closed switch and said third switch in series to shunt said energization winding of said first relay means so that upon said first switch closing said second relay means is energized through a circuit having a lower resistance path than said energization winding of said first relay means, said first relay means being energized when said shunt is removed by said abnormal condition responsive switch opening, through a high resistance circuit including said second relay energization winding even though the current is reduced enough to cause said second relay to be effectively de-energized, and further circuit means for connecting said first relay energization winding to said source when said first switch opens to maintain energization of said first relay means.

3. In a control circuit for controlling the energization of space air conditioning apparatus, first relay means having a high impedance energization winding, and a normally closed switch controlled by said winding, a second relay means having an energization winding and being adapted to control the air conditioning apparatus, time delay means having an actuating means, said time delay means having a switch for providing a closed circuit after a predetermined period of energization of said actuating means, a source of power, electrical circuit means connecting said first and second mentioned energization windings and said switch of said time delay means in series to said source of power, space temperature responsive switch means, low resistance circuit means including said temperature responsive switch means and said normally closed switch for connecting said actuating means to said source, abnormal condition responsive means having a switch for providing an open circuit upon the presence of an abnormal condition, electrical means connecting said normally closed switch and said abnormal condition responsive switch in series to shunt said energization winding of said first relay means, said second relay means being energized when said circuit of said time delay means is closed, said shunt circuit is broken upon the presence of an abnormal condition to place said energization winding of said first relay means in series with said energization winding of said second relay means thereby reducing an energization current to a predetermined low value to cause said second relay means to de-energize said apparatus, said normally closed switch opening said shunt circuit to maintain energization of said first relay means even though said abnormal condition switch is closed upon a termination of the abnormal condition and said condition responsive switch means is subsequently closed, further high resistance circuit means for maintaining said first relay means energized even though said closed circuit is open.

4. In a resettable control circuit for controlling the energization of air conditioning apparatus, first relay means having an energization means and a normally closed switch, second relay means having an energization means and being adapted to control the conditioning apparatus, said energization means of said second relay means requiring a predetermined current value, time delay means having an energizing means and having a switch which is closed after a predetermined period of energization of said last mentioned means, a source of power, first electrical circuit means connecting said first and second mentioned energization means and said switch of said time delay means in series to said source of power, abnormal condition responsive means having a switch for providing an open circuit upon the presence of an abnormal condition, electrical means connecting said normally closed switch and said abnormal condition responsive switch in a series shunting circuit to shunt said energization means of said first relay means so that upon the presence of an abnormal condition said shunt circuit is broken to place said energization means of said first relay means in series with said energization means of said second relay means to reduce the current below said predetermined value to cause said second relay means to de-energize the conditioning apparatus, said normally closed switch preventing de-energization of said first relay means should said abnormal condition responsive switch subsequently close, temperature responsive switch means, and electrical energizing circuit comprising said temperature responsive switch means and said normally closed switch for connecting said energizing means of said delay means to said source of power so that said time delay means is de-energized when said first relay means is energized, and a second electrical circuit means for maintaining said first relay means energized after said switch of said time delay means is opened.

References Cited in the file of this patent
UNITED STATES PATENTS

| | | |
|---|---|---|
| 2,050,076 | Wilms | Aug. 4, 1936 |
| 2,446,474 | Harrold | Aug. 3, 1948 |
| 2,898,746 | Mobarry | Aug. 11, 1954 |
| 2,691,754 | Sloane | Oct. 12, 1954 |
| 2,697,195 | Courtney | Dec. 14, 1954 |